Figure 1:
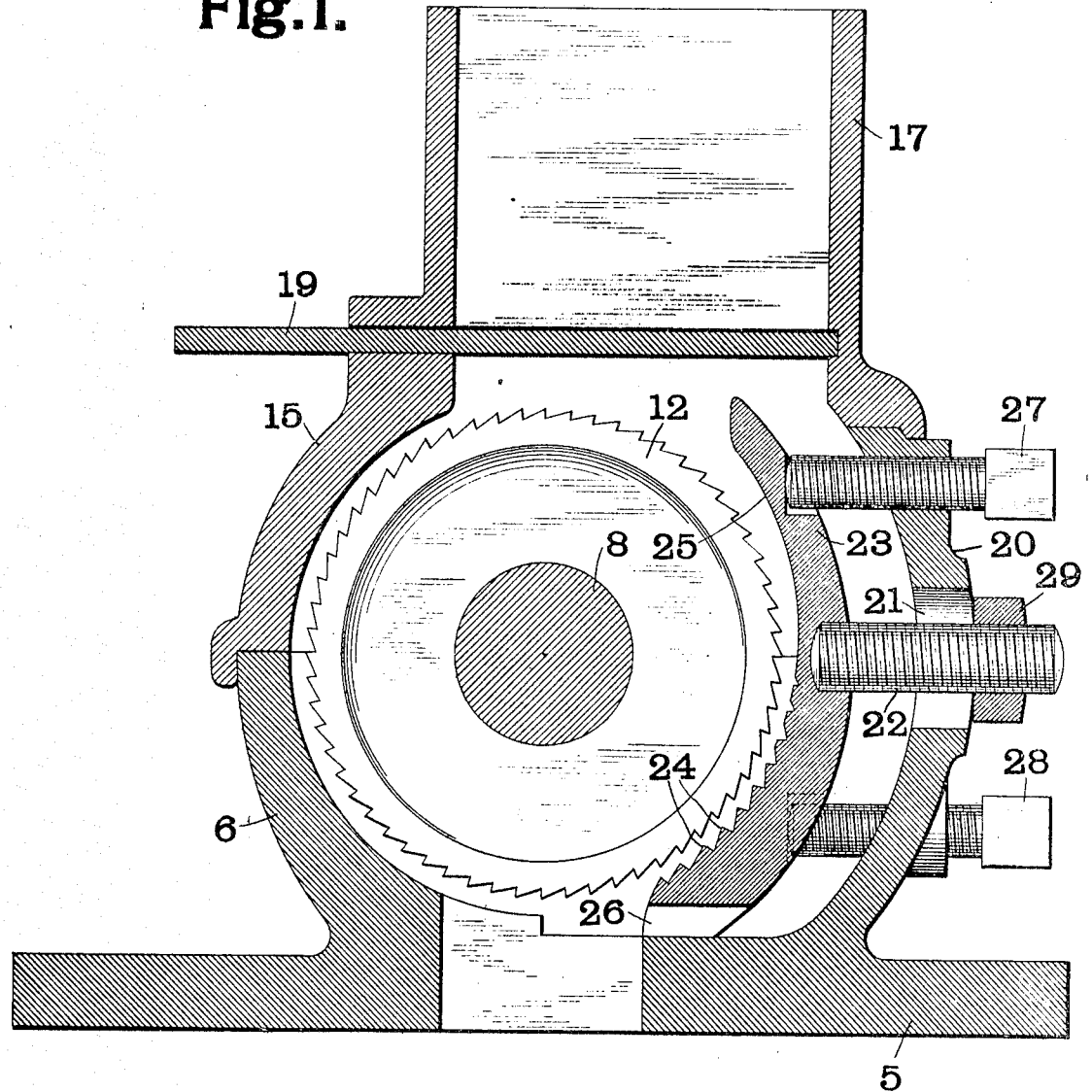

E. UTZ.
GRINDING MILL.
APPLICATION FILED DEC. 30, 1907.

926,305.

Patented June 29, 1909.
3 SHEETS—SHEET 1.

WITNESSES:
L. L. Mead.
W. A. Alexander.

INVENTOR
E. Utz
BY
ATTORNEYS.

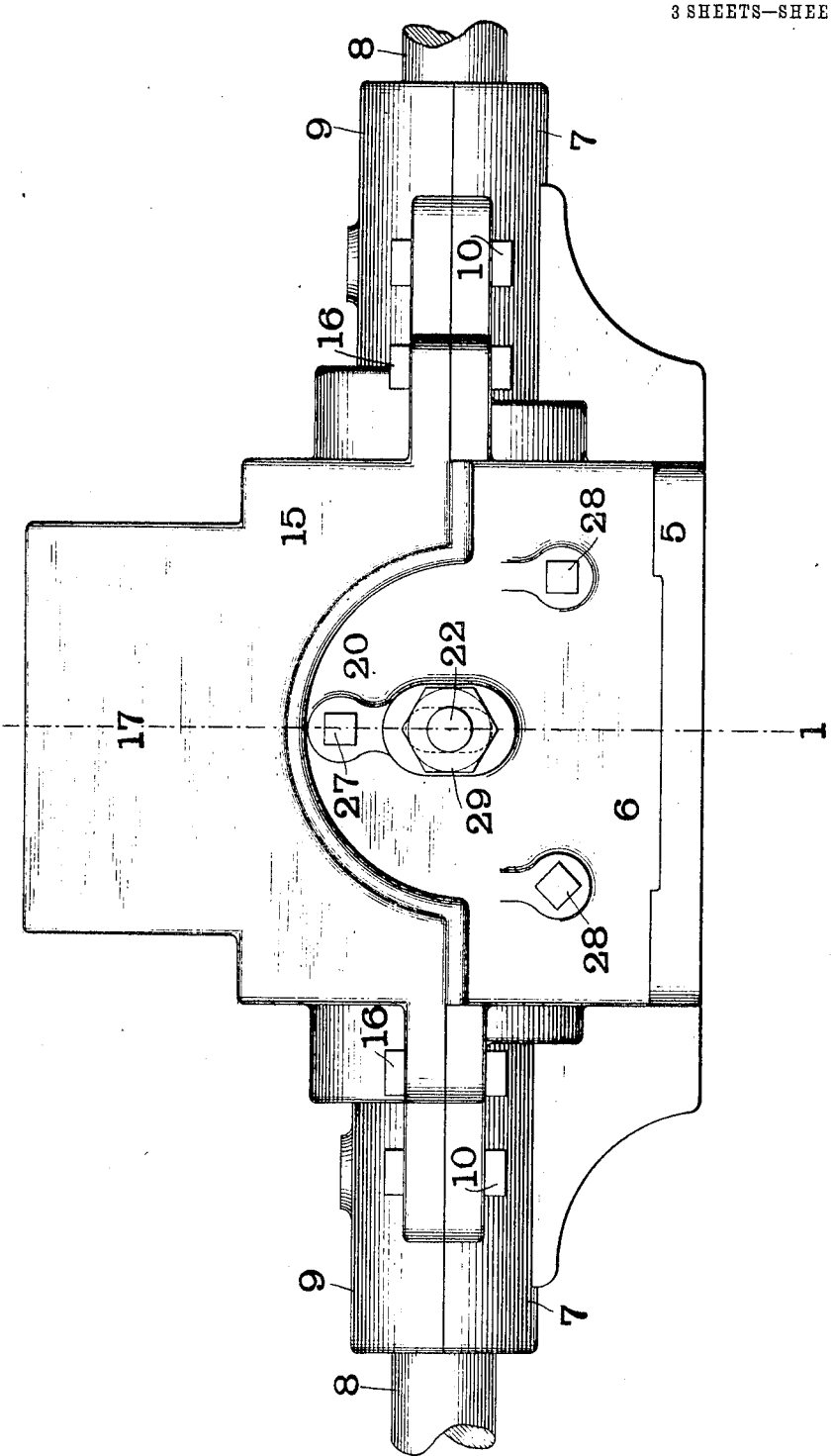

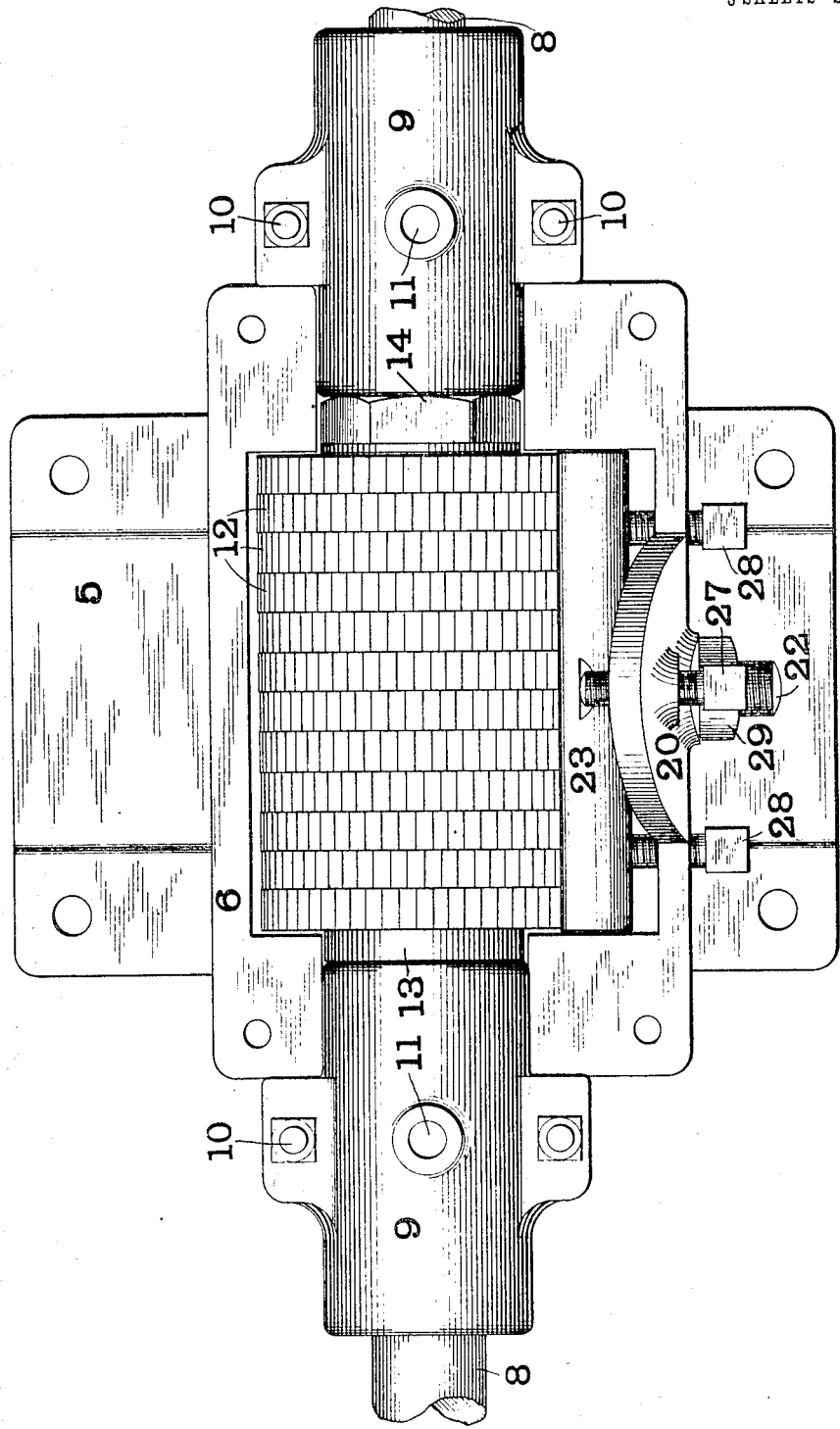

UNITED STATES PATENT OFFICE.

EMIL UTZ, OF WICHITA, KANSAS.

GRINDING-MILL.

No. 926,305.  Specification of Letters Patent.  Patented June 29, 1909.

Application filed December 30, 1907. Serial No. 408,685.

*To all whom it may concern:*

Be it known that I, EMIL UTZ, a citizen of the United States, residing at Wichita, in the State of Kansas, have invented a certain new and useful Grinding-Mill, of which the following is such a full, clear, and exact description as will enable any one skilled in the art to which it appertains to make and use the same, reference being had to the accompanying drawings, forming part of this specification.

My invention relates to grinding mills such as are used for grinding grain, coffee, spices, wheat and the like.

The object of my invention is to provide an improved construction of grinding mill whereby the grinding cylinder or bur and the breast or concave can be readily inspected for adjustment or repair.

Another object of my invention is to provide improved means for adjusting the breast or concave so as to regulate not only the fineness of the material to be ground but also the rate of grinding.

In the accompanying drawings which illustrate one form of mill made in accordance with my invention, Figure 1 is a vertical section on the line 1—1 of Fig. 2, Fig. 2 is a side elevation and Fig. 3 is a top plan view, the upper part of the casing being removed.

Like marks of reference refer to similar parts in the several views of the drawings.

5 is the base plate which is preferably formed integral with the lower part 6 of the casing. The lower part 6 of the casing of provided with extensions 7 forming the lower halves of journal boxes in which is carried the shaft 8 of the grinding cylinder or bur. The upper portions 9 of these journal boxes are held in position by means of bolts 10 and are preferably provided with oil holes 11. The grinding cylinder or bur is composed of a number of toothed disks 12 surrounding the shaft 8 and secured in position between the collar 13 and the nut 14 on the said shaft. The upper portion 15 of the casing is secured in position upon the lower portion by means of bolts 16. The upper portion 15 of the casing is provided with an upward extension 17 forming a feed chute. This feed chute 17 is adapted to be cut off from the interior of the casing by means of a slide 19.

The lower portion 6 of the casing is provided at one side with an upwardly extending semi-circular portion 20 which fits into a corresponding recess in the upper portion 15. Formed in this upwardly extending portion 20 is a vertical slot 21 through which passes a clamping stem 22 carrying the concave or breast 23. This concave or breast 23 has its face provided at its lower part with teeth 24 but smooth upon its upper part 25 as shown in Fig. 1 of the drawings. The lower edge of the concave or breast is provided with feet 26 which rest upon the bottom of the interior of the casing. In order to adjust the concave 23, I provide the upwardly extending portion 20 of the lower part of the casing with a set screw 27 forming an adjustable abutment for the upper portion of the concave 23. The lower portion of the casing 6 also carries a pair of set screws 28 which form adjustable abutments for the lower portion of the said concave. The clamping stem 22 hereinbefore referred to, after passing through the slide 21, is provided on its end with a nut 29 by means of which the concave is clamped firmly in position after being adjusted by the set screws 27 and 28.

In the operation of my mill, power is supplied to the shaft in any suitable manner and the grain or other material to be ground is fed into the chute 17, the slides 19 being, of course, withdrawn. The grain passes into the space between the cylinder 12 and the concave 23 and is ground by the combined action of the teeth of the cylinder and concave. By means of the set screws 28, the lower toothed portion of the concave can be adjusted toward and away from the cylinder so as to regulate the fineness to which the grain or other material is ground. At the same time, by means of the upper set screw 27 the upper smooth portion of the concave can be independently adjusted toward and away from the cylinder so as to regulate the amount of material fed to the grinding portion.

The slide 19, it is to be understood, is used only to cut off the supply of material from the mill and not to regulate the amount of feed. By my construction we are enabled to readily adjust the two portions of the concave independently toward and away from the grinding cylinder and at the same time to always have the lower edge of the concave supported by the casing so that the tendency to rotate the concave around the shaft 8 will not disturb the adjustment nor injure the parts by which the adjustment is obtained.

It will be evident that by removing the upper portion of the casing the cylinder and concave are readily accessible for repairs.

Having fully described my invention, what I claim as new and desire to secure by Letters Patent of the United States is:

In a grinding mill, the combination with a casing, of a grinding cylinder in said casing, a breast for said cylinder, independently adjustable upper and lower abutments for said breast, and a clamping stem carried by said breast and vertically movable in said casing.

In testimony whereof I have hereunto set my hand and affixed my seal in the presence of the two subscribing witnesses.

EMIL UTZ. [L. S.]

Witnesses:
B. T. HARRISON,
J. L. STINGLEY.